United States Patent Office 3,663,703
Patented May 16, 1972

3,663,703
LAXATIVE PHARMACEUTICAL AND METHODS OF USE
Ronald J. Meyer, Orville E. Horsley, and Herman J. Eichel, Cincinnati, Ohio, assignors to American Hoechst Corporation, New York, N.Y.
No Drawing. Original application June 26, 1968, Ser. No. 740,091. Divided and this application May 27, 1970, Ser. No. 51,408
Int. Cl. A61k 27/00
U.S. Cl. 424—275
3 Claims

ABSTRACT OF THE DISCLOSURE

Bis(4-hydroxyphenyl)thianaphthyl-2 - methane having laxative (cathartic) properties of the formula:

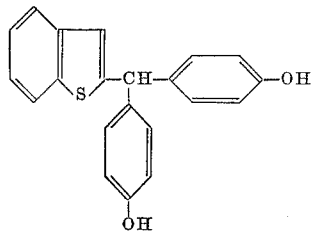

and a process for preparing it.

---

This is a divisional application of application Ser. No. 740,091, filed June 26, 1968, now U.S. Pat. 3,567,738.

Compounds having laxative (cathartic) activity are known, for example, 3,3-bis(p-hydroxyphenyl)phthalide (phenolphthalein) and 1,8-dihydroxyanthraquinone (danthron).

It has now been found that bis(4-hydroxyphenyl)thianaphthyl-2-methane is superior to the compounds named above with respect to its laxative (cathartic) properties and is active in smaller dosages.

It is the object of this invention to provide bis(4-hydroxyphenyl)thianaphthyl-2-methane and a process for preparing it by condensing 2-thianaphthenecarboxaldehyde with phenol.

The reaction is carried out at temperatures in the range of 0° to 150° C., preferably at 20° to 60° C. in the presence of a catalyst. The reaction time is not critical and may range from a few minutes to several hours. Suitable catalysts for the reaction are mineral acids such as sulfuric acid, hydrochloric acid or phosphoric acid, metal halides such as zinc chloride, aluminum chloride, boron trifluoride and tin tetrachloride, or phosphorous halides such as phosphorous trichloride. The preferred catalyst is sulfuric acid.

If desired, the reaction can be carried out in the presence of solvents. Suitable solvents are aliphatic or aromatic hydrocarbons such as benzene, toluene, or xylene, and aliphatic alcohols with 1 to 5 carbon atoms such as methanol, ethanol or propanol. It is also possible to use water and aliphatic carboxylic acids with 2 to 3 carbon atoms such as acetic acid or propionic acid. In the presence of a solvent, one mole of the appropriate aldehyde is condensed with two moles of the corresponding phenol. In the absence of a solvent, it is useful to start the reaction with an excess of the phenol. Instead of the aldehyde, the acetal or bisulfite addition product of this aldehyde can be used as a starting material.

In general, the product according to the process of the invention is obtained by pouring the reaction mixture into a large volume of water. The resulting aqueous suspension may then be neutralized with an alkaline solution such as sodium hydroxide or sodium carbonate, and filtered. The resulting residue can be purified by crystallization from an appropriate solvent, for example, benzene or acetone. Purification of the material may also be accomplished by precipitating the compound from a methanol solution with water one or more times.

The product of the invention has excellent laxative properties and is, therefore, useful for treating constipation in mammals. For instance, the cathartic effect can be demonstrated by administering the compound to rats in doses of 100 milligrams per kg. or less. At the same time, the toxicity is very low. No toxic side effects were observed at the above dosage levels.

For the experiments on rats, the compound was administered by intubation in the form of an aqueous suspension in carboxymethyl cellulose. For practical usage, the compound is applied orally or rectally, the application forms being those normally used in therapy for laxatives, e.g. tablets, hard and soft gelatin capsules, suppositories, oily and aqueous suspensions, and the like. In these preparations, the active substance may be present in concentrations of 5 to 100 milligrams per dosage unit or, in the case of liquids or suspensions, at concentrations of 0.5 to 50 percent. The excipients used are those inert ingredients common to pharmaceutical practice, e.g. talc, glucose, magnesium stearate, agar agar, tragacanth, vegetable and mineral oils, etc.

EXAMPLE

Bis(4-hydroxyphenyl)thianaphthyl-2-methane

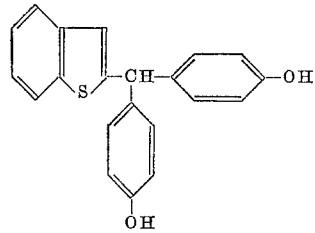

48.7 g. 2-thianaphthenecarboxaldehyde, 56.5 g. crystalline phenol, and 40 ml. anhydrous methanol were combined and cooled to 5° C. in an ice bath, 32 ml. concentrated sulfuric acid was added dropwise with stirring to the cold solution over 45 minutes. An additional 40 ml. methanol was added to decrease the viscosity of the reaction mixture, and the reaction mixture was allowed to stand at room temperature for 12 hours. An additional 40 ml. methanol was added and the reaction mixture was poured into 3 liters of cold water, neutralized with sodium carbonate solution and suction filtered. The residue was dissolved in methanol and again precipitated in water, filtered, dissolved in ethyl acetate and the organic solution dried with anhydrous calcium sulfate. The solution was filtered, evaporated in vacuo, and dissolved in benzene for crystallization. Successive crystallizations from benzene yielded a red product, M.P. 155–156° C.

We claim:
1. A pharmaceutical having laxative properties comprising 5 to 100 milligrams of bis(4-hydroxyphenyl) thianaphthyl-2-methane and a pharmaceutical excipient.
2. A process for treating constipation in mammals which comprises orally or rectally administering thereto an effective amount of bis(4-hydroxyphenyl)thianaphthyl-2-methane.
3. The process of claim 2 wherein said bis(4-hydroxyphenyl) thianaphthyl-2-methane is administered with a pharmaceutical excipient.

References Cited

Burger: Med. Chem. (Interscience, N.Y., 1960) pp. 539–44.

ALBERT T. MEYERS, Primary Examiner

F. E. WADDELL, Assistant Examiner